(12) United States Patent
Neubauer

(10) Patent No.: US 9,520,004 B2
(45) Date of Patent: Dec. 13, 2016

(54) ELECTRONIC PARKING DISC

(71) Applicant: Bent Neubauer Holding ApS, Vejle Ø (DK)

(72) Inventor: Bent Neubauer, Vejle Ø (DK)

(73) Assignee: Bent Neubauer Holding ApS, Vejle O (DK)

( * ) Notice: Subject to any disclaimer, the term of this patent is extended or adjusted under 35 U.S.C. 154(b) by 0 days.

(21) Appl. No.: 14/605,008

(22) Filed: Jan. 26, 2015

(65) Prior Publication Data

US 2015/0197183 A1    Jul. 16, 2015

Related U.S. Application Data

(63) Continuation-in-part of application No. 12/997,738, filed as application No. PCT/DK2009/050144 on Jun. 25, 2009, now abandoned.

(30) Foreign Application Priority Data

Jun. 27, 2008 (DK) ................................. 2008 00896

(51) Int. Cl.
  *G07C 1/30* (2006.01)
  *B60Q 1/48* (2006.01)
  *G01C 19/00* (2013.01)
(52) U.S. Cl.
  CPC . *G07C 1/30* (2013.01); *B60Q 1/48* (2013.01); *G01C 19/00* (2013.01)
(58) Field of Classification Search
  CPC .............. B60Q 1/48; G07C 1/30; G01C 19/00
  See application file for complete search history.

(56) References Cited

U.S. PATENT DOCUMENTS

| 4,245,673 | A  | 1/1981  | Bouteille et al. |
| 5,410,481 | A  | 4/1995  | Kriz |
| 6,697,714 | B1 | 2/2004  | Høj |
| 7,464,871 | B2 | 12/2008 | Neubauer |
| 7,698,032 | B2 | 4/2010  | Matsumoto et al. |
| 8,212,663 | B2 | 7/2012  | Fink et al. |

(Continued)

FOREIGN PATENT DOCUMENTS

| DE | 38 29 031 A1  | 3/1989 |
| EP | 1 221 676 A2  | 7/2002 |

(Continued)

*Primary Examiner* — Hongmin Fan
(74) *Attorney, Agent, or Firm* — David S. Safran

(57) ABSTRACT

Parking disc for mounting on a vehicle in a location so as to be at least externally visible for indicating a time for initiation of the parking with an electronic display which shows the actual time during normal driving and during parking constantly shows the time of initiation of the parking. The parking disc is designed so that switching the display when resuming driving is effected on the basis of an electric signal from at least one detector that determines an actual relative movement of the vehicle in excess of a minimum value with the electronic parking disc continuing to show a fixed time that indicates initiation of parking until the mentioned detector has determined the minimum value of movement of the vehicle has occur. This value may, e.g., be that the vehicle has moved at least a certain distance from the point at which parking had been initiated.

7 Claims, 2 Drawing Sheets

(56) References Cited

U.S. PATENT DOCUMENTS

| | | | |
|---|---|---|---|
| 2002/0041239 A1* | 4/2002 | Shimizu | B60R 1/00 340/932.2 |
| 2002/0190849 A1 | 12/2002 | Orzechowski | |
| 2007/0230280 A1 | 10/2007 | Neubauer | |
| 2008/0027601 A1* | 1/2008 | Sewaki | G01C 19/42 701/31.4 |
| 2009/0298648 A1* | 12/2009 | Sigmund | F16D 48/0206 477/169 |
| 2010/0060444 A1* | 3/2010 | Fink | B60C 23/0433 340/447 |

FOREIGN PATENT DOCUMENTS

| | | |
|---|---|---|
| EP | 1 639 556 B1 | 4/2008 |
| JP | 2007-203987 A | 8/2007 |
| KR | 10-2004-0031191 A | 4/2004 |
| WO | 2004/114225 A1 | 12/2004 |

* cited by examiner

ELECTRONIC PARKING DISC

CROSS REFERENCE TO RELATED APPLICATION

This application is a continuation-in-part of commonly owned, co-pending U.S. patent application Ser. No. 12/997,738, filed Dec. 13, 2010, which co-pending application is a §371 of PCT/DK2009/050144, filed Jun. 25, 2009.

BACKGROUND OF THE INVENTION

Field of the Invention

The present invention concerns a parking disc for mounting on a vehicle where the parking disc is placed visible from outside, where the parking disc includes means for at least externally indicating a time for initiation of the parking, where means for indicating the time consists of an electronic display which during normal driving is connected to an electronic clock, where the display during normal driving shows the actual time and where stopping the vehicle results in switching of the display, where the display during parking constantly shows the time of initiation of the parking, and where the display by resumption of the driving is switched to the actual time, where switching of the display by resuming the driving occurs on the basis of an electric signal from at least one first detector which determines an actual relative motion of the vehicle.

Description of Related Art

The present invention further concerns a method for operating a parking disc mounted on a vehicle where the parking disc is placed visible from the outside, where the parking disc includes display means for at least externally indicating a time for initiation of the parking, where means for indicating the time consists of an electronic display which is connected to an electronic clock during normal driving, where the display shows the actual time during normal driving and where stopping the vehicle results in switching of the display, where the display constantly shows the time of initiation of the parking during parking, and where the display is switched to show the actual time by resumption of the driving, where switching of the display by resuming the driving occurs on the basis of an electric signal from detectors which detectors determine an actual relative motion of the vehicle, where the switching of the display occurs after determining a minimum value from detectors for the motion of the vehicle.

WO 00/75878 discloses an electronic parking disc showing actual time during operation of a vehicle, while at the initiation of parking when the ignition of the vehicle is switched off, the parking disc maintains displaying a fixed time until the next time the ignition is switched on. This prior art has both a forward facing display shaped as a normal Danish parking disc with a single pointer showing hours, and at the inner side of the parking disc there is provided a digital display so that the inwards facing clock during normal operation functions as a normal car clock. In order to ensure optimum display of actual time, the electronic parking disc contains a radio receiver for receiving a long-wave signal from a transmitter transmitting time information, or there is a receiver for receiving GPS satellite signals containing information about time.

The said parking disc has been approved by the authorities in Denmark, but in spite thereof it has various drawbacks. A substantial drawback may be that it is possible to reset a parking time by simply switching on the ignition of the vehicle and the leave the vehicle again, i.e., the parking time is renewed without moving the vehicle. Such an action is not allowed according to the common parking rules, but is almost impossible to check. I.e., traffic wardens would be sceptical of this electronic parking disc if they are aware of the possibility of cheating. Thus there may arise a number of contentious issues between traffic wardens and vehicle owners provided with electronic parking discs, as the traffic warden may assert abuse by demonstrating that the car wheels haven't been moved in spite of the parking time having been changed.

German Utility Model DE 2907726 U1 also concerns an electronic parking disc where the clock of the parking disc is satellite controlled. However, any satellite control of a clock in an electronic parking disc will not be very suited for parking in closed parking facilities without free access to open sky, i.e., parking in cellars or the lower storeys in high parking buildings where a satellite signal cannot be received.

German Patent DE 38 29 031 also includes an electronic parking disc which is activated at the absence of an ignition signal and which is deactivated by means of a detector registering e.g. turning of engine, gearbox or wheels.

European Patent Application EP 1639556 B1 concerns a parking disc for mounting on a vehicle where the parking disc is placed visible from outside, where the parking disc includes means for at least externally indicating a time for initiation of the parking, where means for indicating the time consists of an electronic display which during normal driving is connected to an electronic clock, where the display during normal driving shows the actual time and where stopping the vehicle results in switching of the display, where the display during parking constantly shows the time of initiation of the parking, and where the display by resumption of the driving is switched to the actual time, where switching of the display by resuming the driving occurs on the basis of an electric signal from at least one detector which determines an actual relative motion of the vehicle, where the switching of the display occurs after determining a minimum value for the motion of the vehicle where the switching of the display is effected on the basis of a detector detecting a minimum acceleration during movement of the vehicle.

SUMMARY OF THE INVENTION

It is the purpose of the invention to provide an electronic parking disc that keeps showing the time of the initiation of the parking even if the ignition of the vehicle is turned on, and where switching to display of actual time only occurs after fulfilling operation conditions from a combination of detected signals.

This may be achieved with a parking disc as the one described in the introduction, if the parking disc further comprises at least a second detector which second detector is a gyro meter for detecting turning of the vehicle.

Switching of the display may be effected on the basis of a combination of measured parameters indicating movement of the vehicle. One of the parameters can be minimum acceleration during the movement of the vehicle. A second parameter can be derived from a gyro meter, which indicates turning around one or more aches. Hereby, it may be achieved that the parking disc is at first released when a vehicle has both accelerated and turned. This results in a very efficient parking disc for both the user and for the parking administration, because the reliability is very high.

By using a combination of parameters for detecting motion or stop of vehicles, this parking disc can be used in a lot of different vehicles.

Switching of the display may be effected on the basis of a minimum acceleration determined in a uniform direction over a predetermined period of time in combination with turning which may be at least 60 degrees. Hereby may be achieved great assurance of a real movement of the vehicle, since if an acceleration detector measures changing direction of an acceleration, this may indicate that the vehicle is subjected to vibrations, e.g. caused by wind action, or that someone pushes the vehicle for achieving a rocking motion in the suspension of the vehicle. If acceleration has been constant over some time in combination with turning the vehicle it means that the vehicle has achieved a minimum speed and that the vehicle is turned. On the other hand, the absence of an acceleration signal may be used as indication of the initiation of a parking. Therefore, a signal from an accelerometer monitoring the direction of the acceleration in combination with the turning will be suitable for performing switching of the display of the parking disc via an electronic control system.

Hereby may be achieved that the electronic parking disc continues to show a fixed time that indicates start of the parking, until the mentioned detectors has determined movement of the vehicle. This may e.g. be that the vehicle has been turned and moved a number of meters in relation to the point at which parking has been initiated. In that way, it will be very difficult to cheat with the electronic parking disc, and during common use of the parking disc by this invention there will not be any problems for the user, as the user with good intentions who do not want to cheat with the display of the parking disc may use the electronic parking disc without disadvantages. At the same time, a parking disc of this type will quickly be accepted by traffic wardens as being a reliable parking disc, whereby cheating may never occur and the actual parking time will never be contended.

By a first embodiment of a parking disc, the switching of the display may be effected on the basis of a minimum distance for the motion of the vehicle determined by a detector. By determining a movement for the vehicle, a detector may, e.g., determine that the wheels or a shaft has rotated a certain number of times, possibly in the same direction, before switching of the parking disc is produced. Thereby it will be almost impossible to cheat with the electronic parking disc.

Switching of the display can be effected on the basis of a minimum turning determined in a uniform direction over a predetermined period of time. Hereby, it can be achieved that switching takes place after the vehicle is turned from one direction to another. Integrated circuits can comprise a gyro, which integrated signal measures all angular movement in three directions.

Switching of the display can be effected by a combination of signals from the acceleration detector and from the gyro meter. This can result in a very reliably parking disc.

In an alternative embodiment, the switching of the display may be effected on the basis of a minimum speed for the motion of the vehicle determined by a detector. By this may be achieved that the vehicle is to reach a motion speed before switching of the display is effected. Achieving a minimum speed of, e.g., 20-30 km/h will not be possible for the vehicle while still standing on a parking lot or while it is moved on a parking lot, and thereby it is ensured that the vehicle is really moved before resetting to display actual time by the parking disc display occurs. This embodiment of the invention will also in the long run gain trust from users as well as from traffic wardens.

The switching of the display may be effected by a detector of the vehicle determining a minimum speed, acceleration or travelled distance, where an existing signal to the automatic door lock of the vehicle for automatic door locking at the exceeding of a minimum sped is simultaneously used for switching the display of the parking disc. Hereby may be achieved that existing detectors in vehicles are utilised for an additional application, which may occur without interfering with the other functions of the vehicle. Switching of the electronic parking disc on is just a question of knowing where to make an electronic connection, after which the electronic parking disc will function optimally.

By a second alternative embodiment, the switching of the display can be effected on the basis of an existing electric signal expressing the speed of the vehicle, where the electronic parking disc includes means for determining a minimum speed on the basis of an existing signal, where the display of the parking disc is switched on the basis of exceeding the determined minimum speed. Hereby may be achieved that e.g. it is an electronic speedometer signal which is used. A signal provided in vehicles using digital speedometers, but also in vehicles where the speedometer communicates with an electronic sensing of one of the rotating shafts of the vehicle. Thus there will typically appear one or more electronic pulses per revolution for this shaft, by which the actual speed is determined on the basis of the time lapsed between electric pulses. A signal of this type coming directly into the electronic parking disc may be used for determining a minimum speed. If the pulses are absent for a period of time, this may be used as indication of parking the vehicle.

A radio wave carried navigation signal may be utilised for indicating the movement of the vehicle for switching the display of the parking disc. Hereby maybe achieved that actual standstill of the vehicle activates the parking disc, while movement of the vehicle causes termination of the parking. GPS signals may be used, but signals from local radio transmitters can also be utilised by determining phase differences between received signals. Signals from cellular transmitter masts may thus be utilised for indicating movement and standstill for a vehicle.

DETAILED DESCRIPTION OF THE INVENTION

Figure 1:
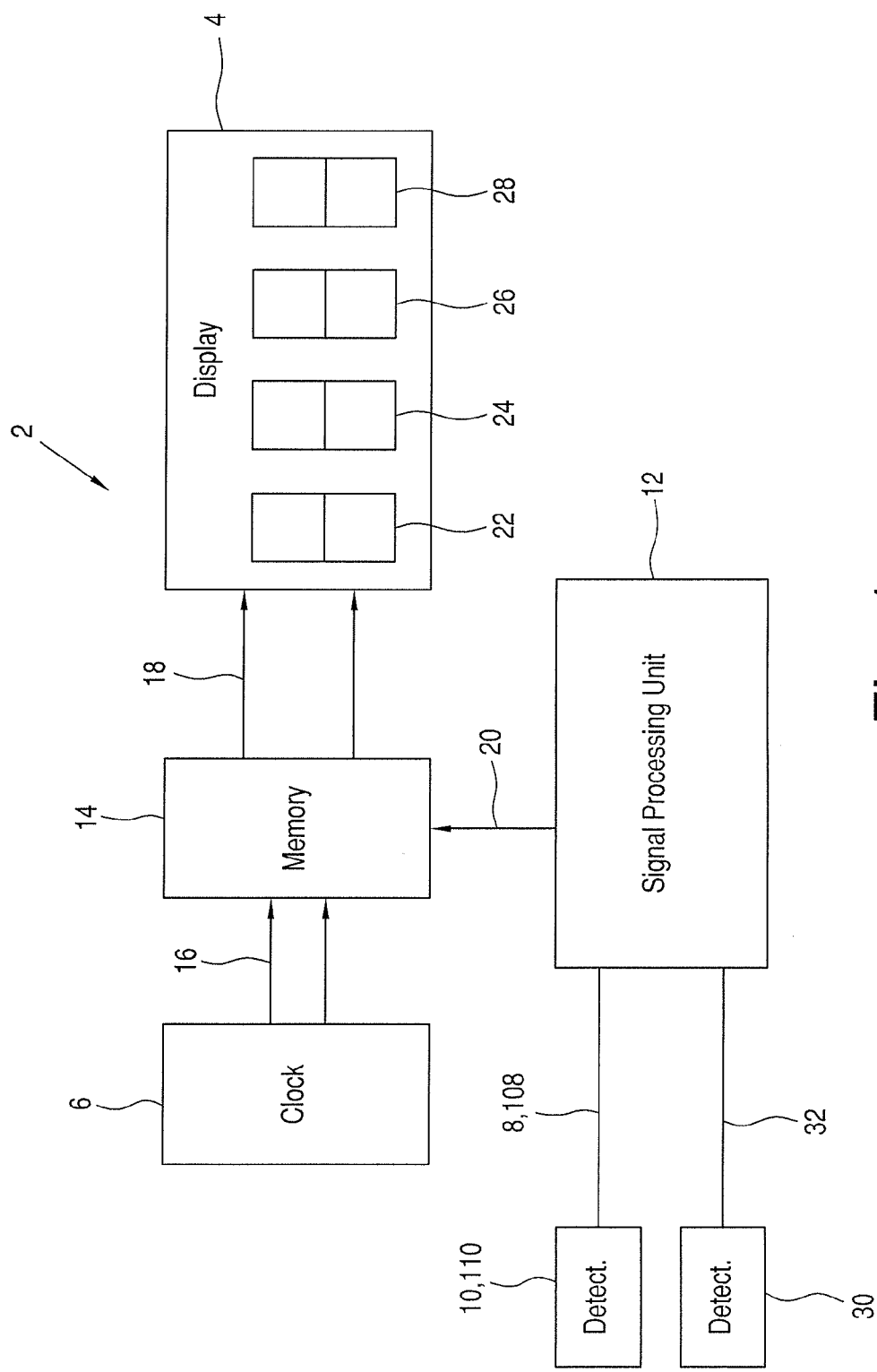
FIG. 1 shows a possible embodiment of the invention in the form of a block diagram.

An electronic parking disc 2 contains a display 4 that communicates with an electronic clock 6, where a signal wire 8 communicates with an first detectors 10 and a second detector in form of a gyro detector 30, which detectors 10, 30 are connected to a signal processing unit 12. An electric connection 20 goes from signal processing unit 12 to a memory unit 14 that receives a time signal over a data bus 16 from the electronic clock 6, and where the memory unit 14 over a data bus 18 transmits a signal to display 4 containing segments 22, 24, 26 and 28.

The operation of the parking disc on the Figure may be as follows: During normal operation, the electronic clock 6 may deliver a time signal over databus 16, and this signal is forwarded through memory unit 14 over databus 18 to display 4 so that the display shows actual time. A condition for actual display of time may be that the signal wire 20 connecting the electronic control unit 12 with memory unit 14 contains a logical 1. This condition remains unchanged as long as the detectors 10,30 detect that the vehicle is driving. If the vehicle has stopped and the detectors 10,30 indicate the stop, the electronic control unit 12 will interrupt the logical signal on the signal wire 20, after which memory unit 14 is locked for constant display of the time. The display 4 will thereby show a time for the initiation of the parking. Control unit 12 will keep signal wire 20 at a logical 0 until a signal comes from detectors 10, 30 over signal wires 8, 32, indicating that the vehicle is moving. Then, the signal wire 20 will change to a logical 1, and memory unit 14 is now opened so that the actual time signal is transferred to display 4.

A second embodiment of the invention may instead use an accelerometer which is provided in the vehicle beforehand, associated with airbags or other safety devices.

The electronic parking disc may be designed with both an outwards facing display and an inwards facing display, where the outwards facing display may consist of a pointer that may be designed for indicating fixed points in time with intervals of e.g. 15 minutes. The electronic parking disc may include means for manual setting of a time for initiation of the parking. Also, adjustment of the electronic clock may be required. Application of radio-controlled clocks is an obvious possibility, but advantageously the electronic clock may include a local oscillation circuit enabling the electronic clock to continue correct indication of time even if the radio signals are absent. The electronic parking disc may contain an indication of the actual condition, e.g. in a lamp or a light diode indicating parking. Another possibility is that the display is switched off when not parking.

Figure 2:
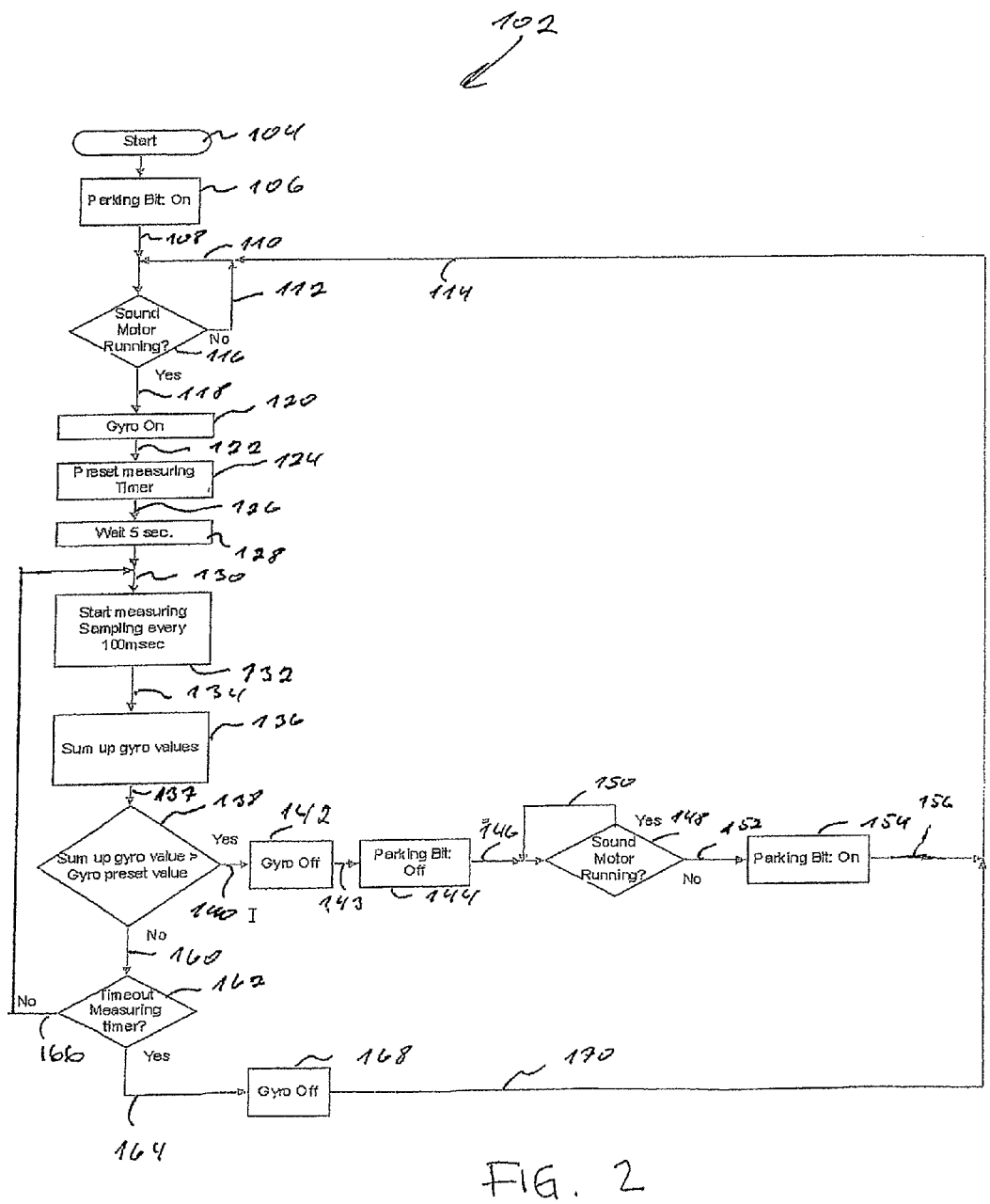
FIG. 2 shows a flow diagram for the operation of a parking disc.

FIG. 2 shows a flow chart 102 which flow chart 102 has a start box 104, which start box 104 is connected to an activity box 106, which switches a parking bit on. It is to be understood that the present operational situation is that the car is parked and the motor is at a stop. The box 106 transmits that the parking bit is on over line 108 towards a decision block 116, which detects if the motor is running. This means that the decision block 116 can be part of a vibration detector. If no sound of motor is detected then there is a line 112 which through a line 110 is connected to the line 108, so that a loop is performed. The flow chart continues in the loop until the decision block 116 has detected the motor running and a bit is transmitted over line 118 to a block 120, which switches on the gyro. Further, over line 122 there is a connection to a block 124 with a function preset measured timer where a timer function is reset to a zero position so that when the timer is activated, a waiting cycle can be generated. Further over communication line 126 to a time delay 128, which is waiting five seconds for a valid gyro signal. Further, a signal is transmitted over line 130 to the block 132 where sampling every 100 ms is performed of the gyro signal. The signal is transmitted each time the gyro signal is measured over line 134 to the block 136, which block sums up the gyro values. The accumulated values are performed for right as well as left gyro signals. The sum of the values is transmitted over line 137 to a decision buck 138 where a decision is made, if the accumulation of gyro values are accepted, a yes-transmission is performed over line 140 to a block 142 that turns off the gyro and further over a line 143 to a block 144 for setting the parking bit off. This information is sent further by a line 146 to a decision block 148 for detecting sound of running motor. If yes to the sound motor running, a line 150 goes to line 146 also to the input of the sound motor running decision block 148. Thereby a loop is performed. If no to the sound motor running, this is indicated by line 152 continuing into block 154 parking bit on. Parking bit on communicates over line 156 towards the line 114 and towards the line 108 and into the block 116 and the process continues. Jumping to the decision block 138, this block sums up gyro value and detects if the value is over a preset value, if there is a no, line 160 leads to decision block 162 where a time out for the measuring timer is performed. If no, line 166 leads to the line 130 and the process in the block 132 starts measuring sampling continues. In this way, a further loop is performed. If the time out measuring timer in decision block 162 comes out with a yes, then line 164 goes to a block 168, which turns the gyro off. A line 170 combined with the line 156 leads over line 144 towards the block 116 for detecting sound of running motor.

By using this flow diagram the gyro is only in operation when the car is driving. This leads to energy saving and increases the life time of the batteries in the parking disc.

What is claimed is:

1. A parking disc for vehicles which parking disc comprises at least a display placed so that it is visible from the outside of a vehicle, which parking disc is configured in a first mode of operation to indicate actual time during driving motion of the vehicle based on an electronic clock and is operatively configured with a first detector that adapted for detecting driving motion of the vehicle and for detecting stopping of the driving motion of the vehicle, the parking disc being responsive to detecting of stopping of the driving motion of the vehicle for switching operation of the parking disk to a parking detection second mode of operation in which the parking initiation time is displayed; and in response to detection of driving motion of the vehicle being resumed by the first motion detector, the parking disc being adapted to end the parking detection mode and to again indicate the actual time in the first mode of operation once a second detector detects turning of the vehicle, the second detector being a gyro sensor, thereby switching the display into the first mode of operation to indicate the actual time by the vehicle being turned and moved a limited distance in relation to a point at which the parking initiation time has been displayed: wherein the parking disk is adapted for switching back into a driving motion mode upon detection of a minimum turning curve in a uniform turning direction over a predefined period of time by the second detector.

2. The parking disc according to claim 1, wherein the first detector is formed as an acceleration detector to determine a minimum acceleration in a uniform direction over a predefined period of time.

3. The parking disc according to claim 2, wherein the first detector is formed as an acceleration detector, and wherein switching of the mode of operation is effected by a combination of signals from the first detector and the second gyro detector.

4. The parking disc according to claim 3, wherein the parking disk is adapted for the switching of the mode of operation on the basis of a minimum distance for the motion of the vehicle determined by the first detector.

5. The parking disc according to claim 3, wherein the parking disk is adapted for the switching of the mode of operation on the basis of a minimum speed of the motion of the vehicle determined by the first detector.

6. A method for operating a parking disc comprising the steps of:

a. operating the parking disk in a vehicle in a first mode of operation in which a first motion detector indicates movement of the parking disc,
b. using an electronic clock to generate a signal with which actual time is shown on a display of the parking disc in the first mode of operation,
c. switching the parking disc to a second parking detection mode of operation in response to a first motion detector indicating driving of the vehicle has stopped,
d. changing the display to indicate starting of parking in the second mode of operation,
e. switching the parking disc to a third mode of operation if the first detector detects resumption of driving,
f. letting the display continue to indicate the start of parking in said third mode of operation of the parking disc until a second turning detector, formed by a gyro sensor, indicates a minimum turning curve of the vehicle in a uniform turning direction, in response to which the parking disc is switched back into the first mode of operation in which the display indicates the actual time, in a manner switching the display into the first mode of operation to indicate the actual time by the vehicle being turned and moved a limited distance in relation to a point at which the parking initiation time has been displayed.

7. The method for operating a parking disc according to claim 6, wherein said changing the display to indicate starting of parking is produced in the second mode of operation when said gyro sensor detects turning of the vehicle.

\* \* \* \* \*